United States Patent [19]

Kallestad et al.

[11] Patent Number: 4,522,335

[45] Date of Patent: Jun. 11, 1985

[54] METHOD AND APPARATUS FOR AERATION OF STORED GRAIN

[75] Inventors: Daniel R. Kallestad, Excelsior, Minn.; Bruce A. Kress, Laura, Ohio; Kenneth I. Satre, Frost, Minn.

[73] Assignee: Sentry Technologies, Inc., Excelsior, Minn.

[21] Appl. No.: 567,427

[22] Filed: Dec. 30, 1983

[51] Int. Cl.³ ........................ F26B 21/00; E04H 7/00
[52] U.S. Cl. .................................. 236/44 C; 236/49; 34/54; 98/55
[58] Field of Search ................. 236/44 R, 44 C, 44 E, 236/49; 34/54, 50, 20, 38, 55, 233; 98/53, 55; 374/102, 103, 108

[56] References Cited

U.S. PATENT DOCUMENTS

| | | | |
|---|---|---|---|
| 3,408,747 | 11/1968 | Steffen | 34/15 |
| 3,563,460 | 2/1971 | Nine | 236/49 |
| 3,831,450 | 8/1974 | Schipke et al. | 374/102 |
| 4,045,878 | 9/1977 | Steffen | 34/26 |
| 4,053,991 | 10/1977 | Steffen | 34/233 X |
| 4,175,418 | 11/1979 | Steffen et al. | 73/342 |
| 4,253,244 | 3/1981 | Kranzler | 34/233 X |
| 4,386,471 | 6/1983 | Bowrey et al. | 34/54 X |

Primary Examiner—Harry Tanner
Attorney, Agent, or Firm—Dorsey & Whitney

[57] ABSTRACT

A method and apparatus for the controlled aeration of stored grain is disclosed that provides for aeration of grain when ambient temperature and relative humidity levels are within a specified range of optimum levels. Aeration of grain is initiated when both the current ambient air temperature is within an acceptable range of the recent average air temperature, and the equilibrium moisture content supported by the current air temperature and relative humidity levels is within an acceptable range of the desired grain moisture content. Long periods between aeration are avoided by progressively widening the range of acceptable current ambient air temperature and equilibrium moisture content levels when less than a predetermined amount of aeration has occurred. The method also provides for the maintenance of a uniform temperature within the stored grain, and assists in avoiding extreme storage temperatures. The apparatus disclosed provides for continuous monitoring of ambient atmospheric conditions, and initiates aeration of stored grain automatically, in accordance with the inventive method, without continuous operator involvement.

20 Claims, 4 Drawing Figures

METHOD AND APPARATUS FOR AERATION OF STORED GRAIN

BACKGROUND OF THE INVENTION

1. Field of the Invention

This invention relates to a method and apparatus for the controlled aeration of stored grain. More particularly, the invention relates to a method and apparatus for sensing ambient temperature and relative humidity conditions and selectively aerating grain when suitable or best-available ambient temperature and relative humidity conditions are present.

2. Description of Prior Art

Mold is the major cause of spoilage in stored grain. Mold growth occurs when a moisture and temperature environment suitable for mold is present around the stored kernels. Foreign matter, along with higher temperatures and higher humidities, provide the most favorable environment for mold growth. Clean grain can be stored indefinitely in a storage bin if its moisture and temperature are kept within acceptable limits.

Moisture can be introduced into the air spaces around stored grain by condensation or by the natural respiration of the grain. Condensation can occur when relatively warm, moist air is introduced into the bin and comes into contact with grain that is colder than the air. Condensation more frequently occurs as a result of moisture migration, which happens when natural convection currents within the bin bring warm air from one region of the bin into contact with cooler grain in another region. Crusting and spoiling can result. It is known that the effects of condensation can be minimized by keeping the temperature of the grain at or near the average ambient air temperature.

Moisture introduced into stored grain from the natural respiration of the grain is a function of the temperature and relative humidity of the air surrounding the grain. For a specified temperature and relative humidity combination of the surrounding air, there is a corresponding equilibrium moisture content for the grain; that is, if the air surrounding the grain is kept constant at the specified conditions, the grain will eventually reach the equilibrium moisture content. Moisture will be given off by the grain kernels when the moisture content of the grain exceeds the equilibrium moisture content supported by the surrounding air conditions; conversely, moisture content will increase when surrounding air conditions will lead to an equilibrium moisture content higher than that present in the grain kernels. In this regard, it should be noted that mold attacks a grain kernel from the outside in; it is the presence of excessive moisture on the outside of the kernel that is to be avoided.

Mold growth on stored grain, then, can be restricted by controlling the moisture content and temperature of the grain. The grain temperature and moisture content determine the allowable storage time that the grain can be kept before it spoils. For that reason (and others), grain prices are adjusted for the moisture content of the grain. Grain which has an excessive moisture content must either be dried, or used quickly, and is therefore of less value than grain marketed at standard moisture content levels.

The effects of condensation can be controlled by maintaining the stored grain at a temperature equal to the temperature of the surrounding air. The effects of moisture release due to respiration could be avoided by excessively drying the grain. Excessive drying of grain, however, is undesirable for several reasons. First, grain that is at or below its equilibrium moisture content for the ambient air conditions, will not spontaneously give off moisture. It requires energy to remove each additional increment of moisture from a kernel as the kernel dries, and overdrying of the grain below its desired market moisture content consumes energy at an increasingly faster rate as the drying progresses. Secondly, overdrying of grain creates internal stresses within the individual grain kernels, causing cracks and fines, thus lowering the quality of the grain and its market value. Finally, grain is marketed by weight. Overdrying of grain removes more water than is necessary, thereby reducing its total weight. To maximize price, as much moisture should be retained in the kernels as possible, keeping in mind the upper allowable moisture content for safe storage and marketing standards.

Proper storage of grain, then, involves two primary considerations. First, the temperature of the grain should be as close as possible to the temperature of the air surrounding the grain, to avoid moisture migration and condensation. Secondly, the moisture content of the grain should be kept at a predetermined moisture content level that maximizes the weight of the grain at market time, yet is low enough to restrict respiration. A secondary, economic consideration is that aeration used to maintain temperature and humidity should not be performed more than necessary, as extensive aeration fan operation can lead to high energy costs.

U.S. Pat. No. 3,563,460 to Nine discloses a means for controlling the aeration of stored grain. The Nine device incorporates a plurality of temperature sensors located within the grain, and a comparison device for comparing the monitored temperature to a manually set temperature level. An aeration fan is activated when the grain temperature exceeds the set level. The Nine device, however, requires a continual manual adjustment of the set temperature level in order to maintain the grain temperature reasonably near the actual or average ambient temperature. Moreover, the Nine device does not include any mechanism, manual or automatic, to control aeration of the grain as a function of the relative humidity of the ambient air.

U.S. Pat. No. 4,045,878 to Steffen discloses a method for aerating stored grain wherein the stored grain is exposed to a throughput of atmospheric air if the current atmospheric conditions are optimal, in that they are at or near predetermined historical monthly average atmospheric conditions. Although the method disclosed in the Steffen patent, at least in theory, takes into consideration both temperature and relative humidity, application of the method has several drawbacks. First of all, continuous operator monitoring of ambient air conditions is required. Secondly, aeration of grain is premised on historical monthly temperature averages, and not on the actual current average temperature, which can vary considerably from historical seasonal averages. Finally, long periods of time may elapse without any aeration of the grain at all if the predetermined optimal air conditions are not met.

A method for aeration of stored grain that is responsive to the actual (as opposed to historical) average temperature, which provides for controlled aeration of the stored grain even when long periods of less than optimum conditions have elapsed, and that can be implemented by an automated apparatus, would be a decided advantage.

SUMMARY OF THE INVENTION

The problems outlined above are in large measure solved by the method and apparatus for controlled aeration of stored grain in accordance with the present invention. That is to say, the invention hereof provides for the controlled aeration of stored grain to reduce undesired moisture accumulation around the grain kernels due to the effects of condensation and respiration. The method hereof is responsive to ambient temperature and relative humidity conditions, takes into account the actual average temperature over a specified period, and provides for aeration of the stored grain under "next best" criteria when optimal atmospheric conditions are not met over a given period of time. The apparatus disclosed herein provides for continuous monitoring of ambient atmospheric conditions, and initiates aeration of stored grain automatically, without continuous operator involvement.

BRIEF DESCTRIPTION OF THE DRAWINGS

FIG. 2a and FIG. 2b depict the electrical schematic of an apparatus embodying the present invention, with the right margin of FIG. 2a to be aligned with the left margin of FIG. 2b.

DETAILED DESCRIPTION

Figure 1:
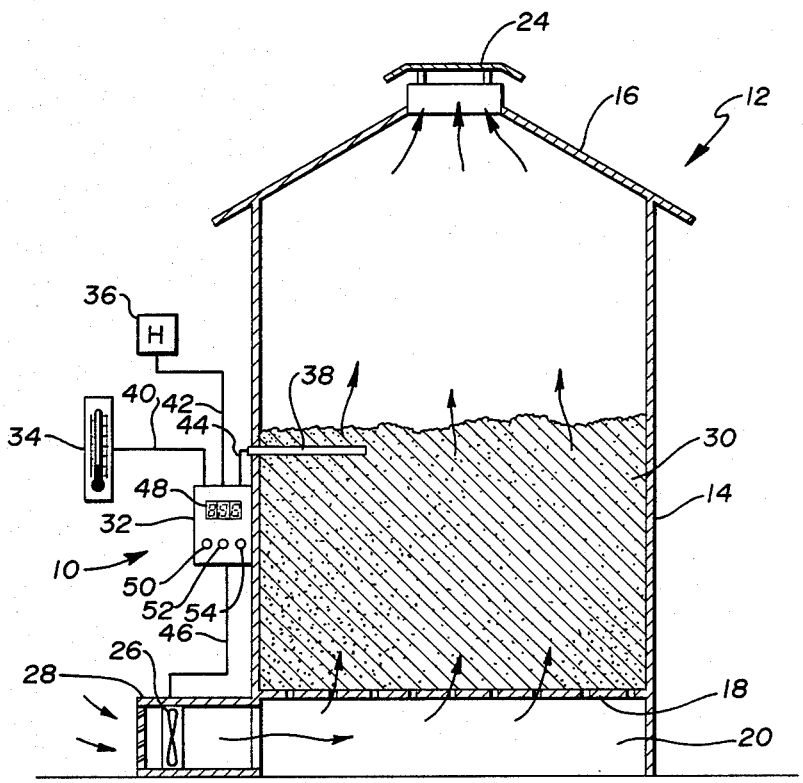
FIG. 1 is a schematic sectional diagram of a grain storage bin with an aeration fan controlled by the present invention.

Referring to FIG. 1, an apparatus 10 for the controlled aeration of stored grain in accordance with the present invention is depicted in conjunction with a grain storage bin 12.

The storage bin 12 includes an upright cylindrical side wall 14 and an apertured, frustoconical roof 16. The bin 12 also includes a raised, perforated floor 18 beneath which is an air-conducting plenum 20. At the uppermost point is a vent 24. An aeration fan 26 is received within conduit 28. Conduit 28 is connected to plenum 20 in air communicating relationship. A quantity of grain 30 is depicted as being stored in the bin 12.

The control apparatus 10 broadly includes a control box 32 attached to the external face of side wall 14, ambient air temperature sensing device 34, ambient relative humidity sensing device 36, and grain temperature sensing probe 38, all connected to control box 32 by respective leads 40, 42, 44. Control lead 46 extends from the control box 32 to the fan 26 for selective operation of the fan 26.

Control box 32 includes a visual display 48, and input controls 50, 52, 54 for operator input of grain type, desired grain moisture level, and the desired time of daily fan operation, respectively. In addition, control box 32 contains a microprocessor and other circuitry for performing the information processing required by the control system.

The method for controlling the aeration of grain in accordance with the present invention will now be described.

The primary input data for the present method are ambient temperature, ambient relative humidity, grain type, desired grain moisture content and desired time of daily fan operation. For a given type of grain, the ambient temperature and relative humidity determine an equilibrium moisture content (or EMC). The EMC for a particular type of grain at specified ambient conditions can be determined either from a table of known values, or from a mathematical formulation which approximates the data in such a table. An example of a table appears at page 6 of "Low Temperature & Solar Grain Drying Handbook" published by Midwest Plan Service, Copyright 1980. An example of a mathematical formula useful in determining EMC is the Chung-Pfost equation explained in ASAE paper 76-3520.

Once the EMC at ambient temperature and humidity (in the following all references to humidity shall mean relative humidity unless otherwise stated) conditions is known, this value can be compared to a preselected desired level of moisture content for a quantity of stored grain. The aeration fan of the grain storage bin can be selectively actuated if the EMC is equal to (or close to) the desired moisture content of the stored grain. Actuation of the fan will expose the grain to a throughput of air at ambient temperature and humidity conditions, thereby causing the grain to move toward a moisture content equal to the EMC determined by ambient conditions.

Aeration of the stored grain when the ambient conditions support an EMC within predetermined limits of the desired moisture content of the grain will minimize the accumulation of moisture due to respiration of the grain kernels. As described above, however, moisture also accumulates within a quantity of stored grain due to the effects of condensation when the grain is exposed to moist air having a warmer temperature than the grain itself. The effects of such condensation are best limited by keeping the temperature of the stored grain at the temperature of the ambient air. Unfortunately, this frequently cannot be done with precision, because the air temperature changes far more quickly than the temperature of a large mass of stored grain. Moreover, if aeration were initiated whenever grain temperature and ambient temperature differed, significant amounts of energy would be consumed by the aeration fan.

A possible solution is to make use of historical data on average monthly or seasonal temperatures, on the theory that if the grain can be maintained at the average monthly or seasonal temperature, this will avoid wide differences between the temperature of the stored grain and the actual ambient temperature. With this approach, aeration would be used whenever grain temperature and the historical average monthly or seasonal temperature differ. Actual temperatures on a daily, monthly or seasonal basis, however, can vary by large amounts from historical averages. Moreover, historical temperatures vary by geographical region and different data would be required by each region.

The present invention rejects both the continuous attempt to track ambient temperature and reliance on historical monthly or seasonal averages. Instead, it has been determined that an actual average temperature computed over a specified averaging period (three weeks in the preferred embodiment, but periods of one week to six weeks might be used) produces excellent results in controlling moisture accumulation within stored grain, when used as the center point of a temperature range with which the control system causes grain to be aerated. In particular, a three week running average is maintained by determining the ambient temperature every fifteen minutes in a given twenty-four hour period and averaging the ninety-six temperature readings obtained within the twenty-four hour period to determine a daily average temperature; a running average based on the most recent twenty-one daily averages is used to determine the three week average temperature. In the preferred embodiment the running average is not a true average of twenty-one individual days. To simplify calculation a single average temperature value is kept and is considered to be the temperature for twenty consecutive days, while the current daily average is calculated in as the twenty-first day. (A time average could also be used by storing twenty-one daily averages and dividing their sum by twenty-one. The running average would then be calculated by dropping the oldest daily average and including the newest.)

From the foregoing it can be seen that the basic aeration control philosophy of the present invention is to permit aeration only when (a) ambient temperature and humidity conditions determine an EMC which is at or near the desired grain moisture content, and (b) the ambient temperature is at or near the running average ambient temperature. It is recognized, however, in the present invention that precisely optimum air temperature and humidity conditions may not occur for long periods and may not persist when they do occur. It is desirable, therefore, to effect aeration of stored grain when the ambient temperature and humidity are within certain predetermined ranges of the optimum conditions. The limit values selected to define these predetermined ranges in the preferred embodiment are described in greater detail below. At this point it suffices to say that the range around the running average temperature could be as large as plus or minus 50° F., while the range around the desired grain moisture content could be as large as plus or minus 10 moisture percentage points around the desired grain moisture content.

The fundamental steps for the method of controlled aeration of stored grain in accordance with the present invention, then, can be summarized as follows. First, the desired moisture content of the particular type of stored grain is selected. Secondly, the actual ambient temperature and humidity conditions are measured and the ambient equilibrium moisture content (EMC) is determined therefrom. Thirdly, a running average temperature is calculated. Fourthly, the ambient EMC is compared to the desired moisture content of the stored grain, and the actual temperature is compared to the running average temperature. Finally, the grain is aerated by actuation of the grain storage bin aeration fan only if the ambient EMC is within a predetermined range of the desired grain moisture content, and the actual air temperature is within a predetermined range of the running average ambient temperature.

Grain within a storage bin will maintain its moisture content and temperature over a period of time due to the semi-isolated environment of the storage bin, and the inherent insulative property of the grain mass. There is no need to continuously aerate the grain, even if optimum atmospheric conditions persist. Moreover, energy consumption by an aeration fan can be a significant consideration, and it is desirable to operate the fan no more than is necessary. Accordingly, the method and apparatus of the present invention provides for operator selection of the desired run time of the aeration fan during any twenty-four hour period. The operator selects the desired run time of the aeration fan based on the size of the fan and its corresponding air moving capacity and energy consumption rate.

While various time choice options might be used, in the preferred embodiment the operator chooses fan operation time in fifteen minute segments, selecting zero, one, two, four, eight, sixteen or thirty-two such segments for a twenty-four hour period. (The operator may also override all control and turn the fan on and off manually for as long as desired.) Thus, the operator may specify desired fan operation times of zero, 15 minutes, 30 minutes, 1 hour, 2 hours, 4 hours or 8 hours. As will be seen below, the desired fan operation time parameter affects several aspects of the present method. For convenience the number of fifteen minute segments selected as desired fan operation time will be referred to as OPSEG.

In the preferred embodiment OPSEG is used to define the initial predetermined range around the running average ambient temperature within which aeration may occur. In particular, when the actual, ambient temperature is within X degrees of the running average ambient temperature, where $X=(1+OPSEG)/2$, rounded down to the nearest integer, the temperature condition for aeration is satisfied. The other necessary condition for aeration is satisfied, in the preferred embodiment, when the ambient air and humidity conditions together determine an EMC within 0.5 percent of the desired grain moisture content. Actual ambient temperature and humidity are sampled every fifteen minutes and if the dual conditions are satisfied, fan operation is initiated for fifteen minutes if the available fan operation time has not been used up.

It is also possible with tight control over the predetermined, acceptable temperature and EMC ranges that conditions for aeration of grain may not be met for a long period of time or, if met briefly, will not persist. In that event, the aeration fan will not be actuated or will not be actuated for long enough periods, and the grain will not be sufficiently aerated. The temperature and moisture content of the grain, when the fan is not activated, will in large measure be maintained by the semi-isolated environment of the storage bin. On the other hand, it will be appreciated that respiration of grain kernels and moisture migration may continue, and, without proper aeration, there will be an accumulation of moisture within the stored grain, and a possible change in grain moisture content. Moreover, due to heat released by grain respiration, the grain will not maintain its temperature indefinitely in the absence of aeration. The drift of the grain from optimum moisture content and temperature levels may become larger as the period of insufficient aeration increases. It will also be appreciated that, as the drift from optimum grain moisture content and temperature levels increases, the amount of aeration to restore the grain to optimum conditions correspondingly increases. In order to accomodate such circumstances, the present invention adaptively adjusts its control parameters. In particular, it selects a continually widening range of "next best", acceptable ambient temperature and humidity conditions so that, even when conditions within predetermined optimum ranges are not met, the grain within the storage bin will receive some aeration. Also, it adapts by preparing to aerate for longer-than-normal periods when acceptable conditions are finally encountered.

As set forth above, the desired run time of the aeration fan during any given twenty-four hour period is selected by the grain bin operator. If the ambient temperature and humidity (actually, the corresponding EMC) do not fall within the predetermined ranges and available aeration time is not fully used, then the amount of selected run time left unused at the end of a twenty-four hour period will be "banked" or stored. For example, if no time has previously been "banked" and acceptable conditions are not met at all for two days, but are met on the third day, the run time available for the aeration fan on the third day will be three times the desired run time limit selected by the operator for a twenty-four hour period. The "banking" of unused run time automatically accounts for the facts that the grain may drift further from desired temperature and moisture content levels as the time between aeration increases, and that more run time is required to bring the grain back to acceptable levels as the margin of drift from optimum levels increases.

It will be appreciated that, as more time is "banked", and the ranges of acceptable temperature and EMC levels are accordingly increased, it becomes more and more likely that the aeration fan will be actuated. The time "banked" will be decreased, time segment for time segment, once the fan is actually operated. As the "banked" time decreases, the ranges of acceptable temperature and EMC levels will accordingly be narrowed, in reverse sequence from the range widening progression.

The method of grain aeration in accordance with the present invention provides for the progressive expansion of acceptable ambient air temperature and EMC levels to ensure that long periods without aeration do not occur. In particular, the range of acceptable temperature and EMC levels is increased as a step function of accumulated or "banked" aeration time. In the preferred embodiment, the range of acceptable temperatures is expanded by plus or minus 1 degree, at each step. The range of acceptable EMC (as determined by ambient conditions) is expanded by plus or minus 0.2 percent at the first step and by 0.3 percent at each following step. The first such expansion step occurs when "banked" aeration time equals or exceeds nine fifteen-minute segments. The second such expansion step occurs when "banked" aeration time equals or exceeds thirteen such segments. The third, fourth, fifth and sixth expansion steps occur when the "banked" aeration time equals or exceeds 20, 32, 64 and 96 such segments, respectively. Further expansions may occur in similar fashion as additional aeration time is accumulated. (It has been found useful to initialize the "banked" fan operation time to 20 segments at system start-up, so that the control system will tend to perform aeration during its initial days of operation in case existing grain conditions at start up require aeration and less than optimum ambient temperature and humidity conditions persist during the initial days of operation.)

In the preferred embodiment, in order to avoid excessive cooling or heating of the stored grain, the running average temperature around which the range of acceptable ambient temperature is defined is never allowed to go below 20° F. or above 65° F. These upper and lower limits may be varied for installations in different geographic areas.

As explained above, maintaining stored grain at a desired moisture content, and at a temperature close to the running average air temperature, are the primary factors to be considered in proper storage of the grain. It will be appreciated, however, that excessively high or low grain temperatures indicate conditions which threaten grain and are to be avoided. Moreover, to reduce moisture migration and condensation within the grain, it is essential that grain temperatures be uniform throughout the storage bin. The method in accordance with the present invention, therefore, provides for several automatic "override" conditions that take precedence over aeration controlled solely as a function of ambient temperature and EMC in the manner described above, so as to avoid extreme, or nonuniform grain temperatures. (The manual override effected by operator selection of manual control of fan operation has been previously mentioned.)

The first override feature takes into consideration that molds are particularly active in grain above 65° F., and that grain which is cooled to below 20° F. during the winter takes an excessively long time to warm up to ambient temperatures in the springtime. For this reason a truncated running average temperature may be used for comparison purposes rather than the normal running average. The truncated running average is calculated by considering all average temperatures below 20° F. to be 20° F. and all temperatures in excess of 65° F. to be 65° F. Moreover, when a top grain temperature probe is installed, the top grain temperature can be compared to the truncated average. When top grain temperature data is available, aeration will be initiated, regardless of other conditions, when (a) the top grain temperature exceeds the truncated running average temperature by 30° F. and (b) the actual ambient temperature is at least 15° F. cooler than the top grain temperature.

The second override feature takes into consideration that the top grain temperature should never exceed the running average ambient temperature by a large margin. The method of grain aeration in accordance with the present invention, therefore, calls for the aeration of the grain regardless of other conditions when (a) the top grain temperature exceeds the running average ambient temperature by at least 10° F., and (b) the actual ambient air temperature is at least 5° F. cooler than the top grain temperature, and (c) the actual ambient humidity is not greater than 90 percent.

The third override feature is coordinated with the basic temperature and EMC criteria for aeration described above, but is intended to make aeration more available by widening the ranges around the temperature and EMC criteria faster than normal. According to this override, the control system enters "reverse highlighting" mode (so-called because of a change in the display 48) when the top grain temperature is not within 8° F. of the truncated running average temperature. In this mode, the desired aeration fan operation time as set by the operator is considered to be doubled for purposes of running the aeration fans and/or "banking" unused aeration time. Thus, more aeration time becomes available and, if available aeration time is not used, aeration becomes more likely to occur due to the increase in banked aeration time and the resulting acceptable temperature and EMC ranges. This override remains in effect until the top grain temperature is again within 5° F. of the truncated running average temperature. In the preferred embodiment, the truncated running average used in the third override feature is calculated as described above, except that only the higher (greater than 65° F.) temperatures are truncated; the third override is primarily concerned with cooling hot grain.

Figure 2:
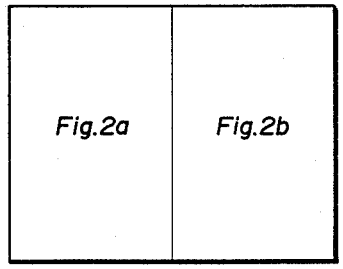
FIG. 2 illustrates how
Figure 2A:
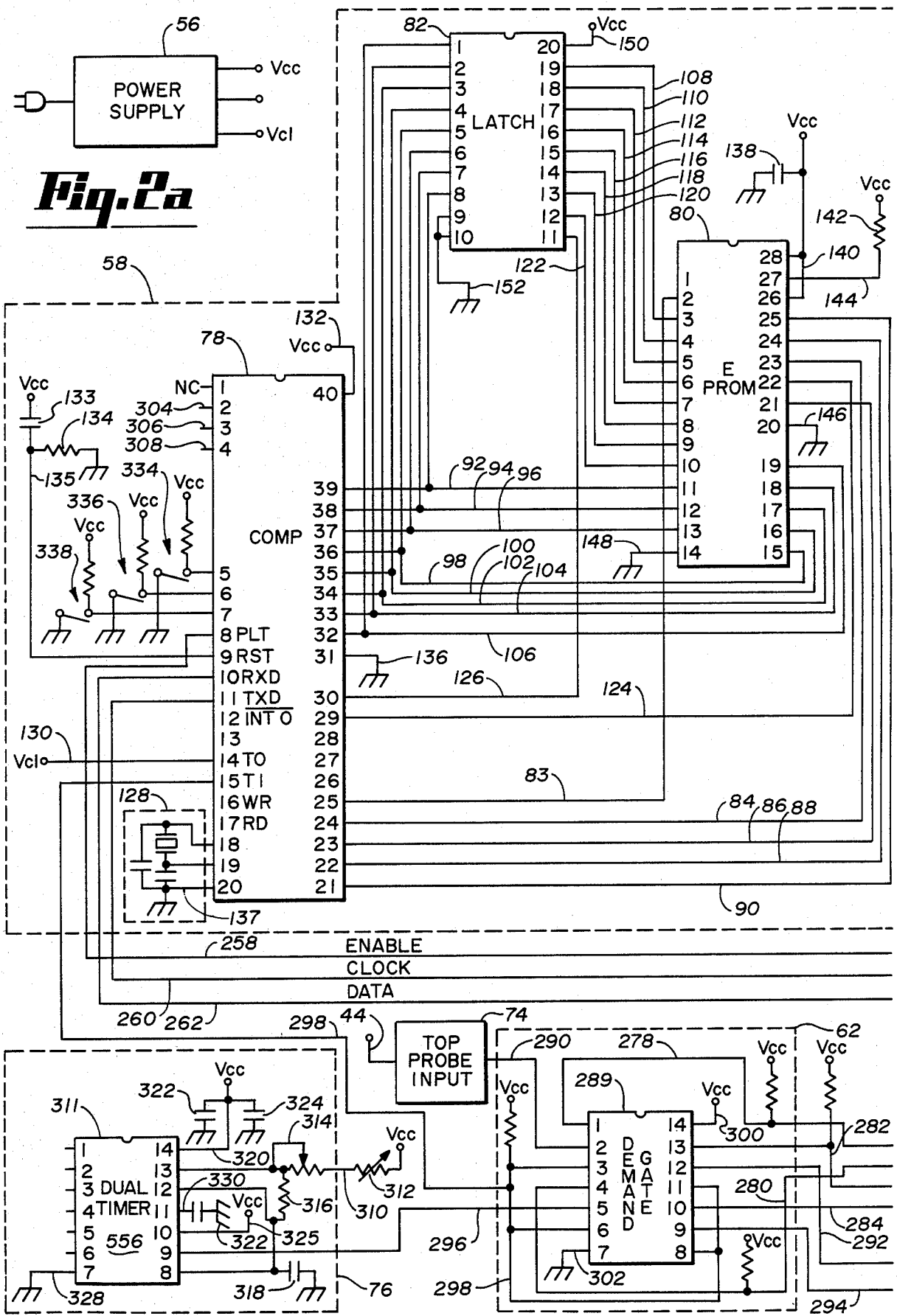
FIGS. 2a and 2b are aligned.
Figure 2B:
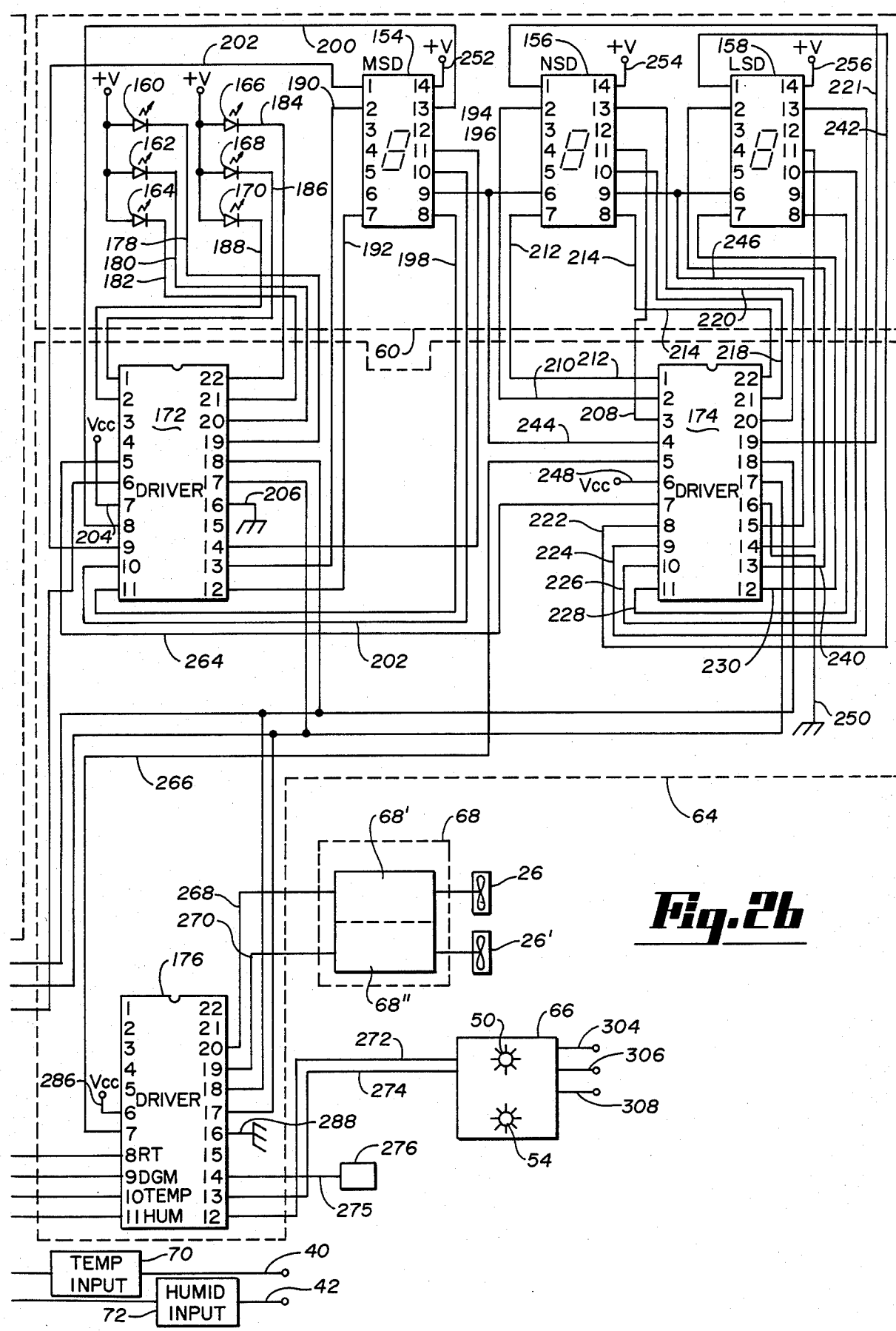

Referring now to FIGS. 2a and 2b the electronic circuitry of the apparatus in accordance with the present invention will be described. Numerals in the figures appearing on the integrated circuit chips indicate actual pin numbers for the indicated types of integrated circuit chips. Reference numbers on electrical lines interconnecting the various integrated circuit chips will assume reference to the drawings for the proper pin connections.

The apparatus 10 for controlling the storage of grain broadly includes a power supply 56, a processing unit 58, a display module 60 (associated with visual display 48), a data input multiplexer circuit 62 for the processing unit 58, a driver unit 64 interfacing between the display module 60 and data input multiplexer circuit 62, grain type and desired time of daily fan operation selection switch 66, solid state fan actuating relay 68, and air temperature, air humidity, top grain temperature, and desired grain moisture level input modules 70, 72, 74, 76, respectively.

The power supply 56 receives standard line AC voltage, and provides DC output voltage levels of 5 volts (VCC) and 2.4 volts, and sixty cycle 5 volts (VCL), for proper operation of the circuit.

The processing unit 58 includes a microprocessor (CPU) 78, memory unit 80, and latch 82. The microprocessor is advantageously a type 8031 unit manufactured by Intel Corporation of Santa Clara, Calif. The memory unit 80 is advantageously a type 2764 eraseable programmable read only memory (EPROM) manufactured by Intel Corporation. The latch 82 is advantageously a type 8282 chip manufactured by Intel Corporation.

Lines 83, 84, 86, 88 and 90, comprise addressing lines interconnecting the CPU 78 with EPROM 80. Lines 92, 94, 96, 98, 100, 102, 104, 106 comprise multiplexed address/data lines interconnecting the CPU 78, the EPROM 80, and the latch 82. Lines 108, 110, 112, 114, 116, 118, 120, 122 comprise data lines extending between EPROM 80 and latch 82 for carrying the data back to the CPU 78 on the aforementioned lines 92, 94, 96, 100, 102, 104, 106. Line 124 is a program send enable line interconnecting CPU 78 and EPROM 80. Line 126 is an output enable line interconnecting CPU 78 and latch 82.

Clock circuitry 128 provides a time reference for operation of the CPU 78. Supply voltage (VCC) at 5 volts, is provided to the CPU 78 via line 132. Capacitor 133 and resistor 134 provide a power-up reset pulse to CPU 78 via line 135. VCL is applied to the CPU 78 via line 130 as a time reference for computing time intervals. CPU 78 is connected to ground via line 136 and 137.

The EPROM 80 is connected to VCC using filtering capacitor 138 and line 140, and to VCC via pull up resistor 142 and line 144. The EPROM 80 is connected to ground via lines 146, 148.

Latch 82 is connected to VCC via line 150, and to ground via line 152.

Display module 60 includes three seven-segment displays 154, 156, 158, and six light emitting diodes 160, 162, 164, 166, 168, 170. The seven segment displays may advantageously be LED-type displays (Part No. HPSD 3730) manufactured by the Hewlett-Packard Company of Palo Alto, Calif. Seven segment display 154 indicates the most significant digit in a three digit number, display 156 indicates the middle digit, and display 158 the least significant digit. The particular value displayed on the three seven-segment displays 154, 156, 158 is indicated by activation of one of the six LED's. In particular, activation of LED 160 indicates ambient air temperature, LED 162 indicates relative humidity, LED 164 indicates the running average air temperature, LED 166 indicates top grain temperature, LED 168 indicates equilibrium moisture content, and LED 170 indicates hours of fan operation during the last fourteen days. In addition, deactivation of all LED's simultaneously indicates display of the accumulated hours of unused fan operation time.

The driver unit 64 comprises three serially connected driver chips 172, 174, 176, which are advantageously type MM5484 chips manufactured by the National Semiconductor Company of Santa Clara, Calif.

Driver chip 172 is connected to LED's 160, 162, 164, 166, 168, 170 via lines 178, 180, 182, 184, 186, 188 respectively. The driver chip 172 is also connected to the seven-segment display 154 via lines 190, 192, 194, 196, 198, 200, 202. Driver chip 172 is interconnected with driver 174 via line 202, and is connected to VCC and ground via lines 204, 206 respectively.

Driver chip 174 is connected to the seven-segment display 156 via lines 208, 210, 212, 214, 218, 220, 221 and to the seven-segment display 158, via lines 222, 224, 226, 228, 230, 240, 242. Lines 244 and 246 each connect driver chip 174 with both the middle digit and the least significant digit seven segment displays, 156, 158. Lines 248, 250 connect driver chip 174 with VCC and ground respectively. The seven segment displays 154, 156, 158 are each connected to the 2.4 volt supply voltage via lines 252, 254, 256 respectively.

Enable line 258 and clock line 260 each interconnect the CPU 78 with each of the driver chips 172, 174, 176. Data line 262 interconnects the CPU 78 with driver chip 172. Data line 264 interconnects driver chips 172 and 174. Data line 266 interconnects driver chip 174 and 176.

Solid state relay 68 is connected to driver chip 176 via actuating lines 268, 270. The solid state relay 68 may include a plurality of switches 68', 68" for actuation of a plurality of fans 26, 26'.

Driver chip 176 is connected to switch 66 by enable lines 272, 274. Enable line 275 extends to a heating coil and coil driver circuit 276. The coil circuit 276 is used for purging of the humidity sensor 36. Lines 278, 280, 282, and 284 comprise top probe temperature, desired grain moisture, air temperature, and humidity input enable lines, respectively, connecting the driver 176 with the input multiplexer 62. Lines 286, 288 connect the driver chip 176 with VCC and ground, respectively.

Multiplexer circuitry 62 comprises a type 7403 quad two-input NAND gate 289 manufactured by the National Semiconductor Company. Frequency encoded input signals from top grain temperature input module 74, air temperature input module 70, humidity input module 72, and desired grain moisture content input module 76 are received by multiplexer 62 via lines 290, 292, 294, 296 respectively. The outputs of each individual NAND gate within the quad two input NAND gate chip 289 are tied together by line 298 and input to the CPU 78 via the same line 298. The NAND gate chip 289 is connected to supply voltage VCC and to ground via lines 300, 302 respectively.

The grain type and desired time of daily fan operation selection switch 66 comprises a multiplexed decoder for conversion of the grain type selection, as indicated by the position of control dial 50, and the desired time of daily fan operation selection, as indicated by the position of control dial 54, into three-bit binary coded signals. (Each dial has a maximum of eight selections.) Enable lines 272, 274 alternately actuate switch 66 for encoding of the grain type and fan operation time selections. The binary coded signals are transferred from the switch 66 to the CPU via lines 304, 306, 308.

The air temperature, humidity, top grain temperature and desired grain moisture content input modules 70, 72, 74, 76 provide interfaces between the various sensors of the control apparatus 10 and the CPU 78. In particular, the temperature input module 70 is connected to air temperature sensing device 34 via line 40, the humidity input module 72 is connected to the humidity sensing device 36 via channel 42, and the top grain temperature input module 74 is connected to the top probe 38 via line 44. The desired grain moisture content input module 76 is connected to the desired grain moisture selection switch 52 via line 310.

Each of the input modules 70, 72, 74, 76 provide for frequency coding of their respective data inputs. For example, the desired grain moisture level input module 76 includes a type 556 dual timer integrated circuit chip manufactured by National Semiconductor Company configured to provide a frequency encoded signal to multiplexer 62 via line 296 for multiplexed transmission of the signal to CPU 78 via line 298. Desired grain moisture selection switch 52 includes a variable resistor 312, which in combination with adjusting resrstor 314, dropping resistor 316 and capacitor 318 provides an input having a variable RC time constant to the timer chip. The timer chip is connected to supply voltage VCC via line 320 and filtering capacitors 322, 324. Timer chip 311 is also connected to VCC via line 326, and to ground via line 328 and via line 330 in conjunction with capacitor 332. Each of the other input modules 70, 72, 74 utlilizes a conventional variable resistance type temperature or humidity sensor in a similar RC circuit to product a frequency encoded signal corresponding to the sensed temperature or humidity.

Manually actuated switches 334, 336, 338, provide for operator control of various functions of the CPU 78. In particular, switch 334 provides for the enable/disable of a four-second delay between turn-on of multiple fans, to avoid large current surges associated with startup of the fans. Switch 336 allows the operator to indicate to the CPU 78 whether or not a top grain temperature probe 38 is installed in grain bin 12. Switch 338 allows the operator to freeze the display of display panel 48, which, under normal conditions, changes its read-out every four seconds.

While the preferred embodiment of the invention has been illustrated and described, it is to be understood that the invention is not limited to the precise method and apparatus herein disclosed, and the right is reserved to all variations coming within the scope of the appended claims. For example, it will be clear that the invention will work in storage bins with a variety of shapes and will work as well with duct-type fan arrangements or with fan arrangements that pull air down through the grain rather than by pushing it up from a plenum. Likewise it is clear that the method could be performed by other comparable circuitry or information processing means. It will further be clear that the invention could be implemented by substituting a desired or target humidity value for the desired grain moisture content and using a range around the desired humidity value, determined and adapted in a similar manner as the range around desired or target grain moisture content. (This is because equilibrium moisture content is determined by a temperature and humidity value.)

What is claimed as new and desired to be protected by Letters Patent is:

1. A method for controlling aeration of stored grain which is to be maintained at or near a specified desired grain moisture content comprising the steps of:
   measuring the current ambient air temperature;
   measuring the current ambient air relative humidity level;
   determining the equilibrium moisture content corresponding to said current ambient temperature and relative humidity readings;
   determining a running average ambient temperature from a plurality of time-spaced measurements of ambient air temperature taken over a specified period of time; and
   aerating said grain when said current ambient air temperature is within a predetermined acceptable range of said running average ambient temperature and said equilibrium moisture content is within a predetermined acceptable range of the desired grain moisture content.

2. The method as claimed in Claim 1 including the step of widening the acceptable range around said running average ambient temperature when less than a predetermined amount of aeration has occurred.

3. The method as claimed in Claim 2, including the step of widening the acceptable range around said desired grain moisture content when less than a predetermined amount of aeration has occurred.

4. The method as claimed in Claim 1, including the step of widening the acceptable range around said desired grain moisture content when less than a predetermined amount of aeration has occurred.

5. The method as claimed in Claim 1, said predetermined acceptable temperature range being within plus or minus 50° F. around said running average ambient temperature.

6. The method as claimed in Claim 5, said predetermined acceptable temperature range being within plus or minus 1° F. around said running average ambient temperature.

7. The method as claimed in Claim 1, said acceptable range around desired grain moisture content being within plus or minus 10 grain moisture percentage points of the desired grain moisture content.

8. The method as claimed in Claim 7, said acceptable range around said desired grain moisture content being within plus or minus 0.5 grain moisture percentage points around said desired grain moisture content.

9. The method as claimed in Claim 1, said step of aerating comprising actuation of an aeration fan.

10. The method as claimed in Claim 1, further comprising the steps of selecting a desired available aeration time during a specified time period and inhibiting the step of aerating when the desired available aeration time has been consumed.

11. The method as claimed in Claim 10, further comprising the step of accumulating that portion of the desired available aeration time not used during each of said specified time periods when said current ambient air temperature and said equilibrium moisture content are not within their respective predetermined acceptable ranges, thereby increasing the desired available aeration time of subsequent time periods.

12. An apparatus for controlling aeration of stored grain which is of a specified type and which is to be maintained at or near a specified desired grain moisture content, comprising:
   current ambient air temperature sensing means;

current ambient air relative humidity level sensing means;

means responsive to the current ambient air temperature sensing means for calculating and storing a running average ambient temperature covering a predetermined period of time;

means responsive to the current ambient air temperature and current ambient air relative humidity level sensing means for determining the equilibrium moisture content corresponding to said current ambient air temperature and relative humidity readings and the specified grain type; and means for comparing the current ambient air temperature to the running average ambient temperature and for comparing said equilibrium moisture content to the desired grain moisture content, said means developing a signal to initiate grain aeration only when both the current ambient air temperature and said equilibrium moisture content are within predetermined acceptable ranges of the running average ambient temperature and the desired grain moisture content, respectively.

13. A method for controlling aeration of stored grain which is of a specified type and which is to be maintained at or near a specified desired grain moisture content comprising the steps of:

measuring the current ambient air temperature;

measuring the current ambient air relative humidity level;

determining the equilibrium moisture content corresponding to said current ambient temperature and relative humidity readings and the specified grain type.

determining an average ambient temperature;

aerating said grain when said current ambient air temperature is within a predetermined acceptable range of said average temperature and said equilibrium moisture content is within a predetermined acceptable range of the desired grain moisture content; and widening the acceptable range around said average ambient temperature when less than a predetermined amount of aeration has occurred.

14. A method for controlling aeration of stored grain which is of a specified type and which is to be maintained at or near a specified desired grain moisture content comprising the steps of:

measuring the current ambient air temperature;

measuring the current ambient air relative humidity level;

determining the equilibrium moisture content corresponding to said current ambient temperature and relative humidity readings and the specified grain type.

determining an average ambient temperature;

aerating said grain when said current ambient air temperature is within a predetermined acceptable range of said average temperature and said equilibrium moisture content is within a predetermined acceptable range of the desired grain moisture content; and widening the acceptable range around said desired grain moisture content when less than a predetermined amount of aeration has occurred.

15. A method for controlling aeration of stored grain which is to be maintained at or near a specified desired grain moisture content comprising the steps of:

measuring the current ambient air temperature;

measuring the current ambient air relative humidity level;

determining from the specified desired grain moisture content and the equilibrium moisture content corresponding to said current ambient temperature and relative humidity readings a desired relative humidity value;

determining an average ambient temperature;

aerating said grain when said current ambient air temperature is within a predetermined acceptable range of said average temperature and said ambient relative humidity level is within a predetermined acceptable range of the desired relative humidity value; and widening the acceptable range around said desired relative humidity value when less than a predetermined amount of aeration has occurred.

16. A method for controlling aeration of stored grain comprising the steps of:

measuring the current ambient air temperature;

measuring the current ambient air relative humidity level;

determining a target relative humidity value;

determining an average ambient temperature;

aerating said grain when said current ambient air temperature is within a predetermined acceptable range of said average temperature and said ambient relative humidity is within a predetermined acceptable range of the target relative humidity value; and widening the acceptable range around said desired relative humidity value when less than a predetermined amount of aeration has occurred.

17. The method as claimed in claim 1, including the step of measuring the temperature of said grain adjacent the upper surface of said grain, and aerating said grain when said upper surface grain temperature exceeds a predetermined value and said ambient air temperature is a predetermined value less than said upper surface grain temperature.

18. The method as claimed in claim 17, wherein the predetermined value which the upper surface grain temperature must exceed before aeration is initiated is calculated by adding a fixed value to said running average temperature.

19. The method as claimed in claim 18, said running average being truncated so as to never exceed a predetermined upper limit.

20. The method as claimed in claim 17, said upper surface grain temperature predetermined value being a value of about 30° F. greater than said running average temperature, and said ambient air temperature predetermined value being as value of about 15° F. less than said running average temperature.

* * * * *